United States Patent [19]
Benesi

[11] Patent Number: 5,510,025
[45] Date of Patent: Apr. 23, 1996

[54] FILTER APPARATUS AND METHOD

[76] Inventor: Steve C. Benesi, 611 McClay Rd., Novato, Calif. 94947

[21] Appl. No.: 316,120

[22] Filed: Sep. 30, 1994

Related U.S. Application Data

[63] Continuation-in-part of Ser. No. 864,524, Apr. 7, 1992, Pat. No. 5,292,434.

[51] Int. Cl.⁶ .................................................. B01D 37/00
[52] U.S. Cl. ......................... 210/227; 210/231; 210/387
[58] Field of Search ........................... 210/227, 231, 210/387, 291, 770, 90, 500.1, 198, 224, 767, 87; 100/198

[56] References Cited

U.S. PATENT DOCUMENTS

| | | | |
|---|---|---|---|
| 3,497,063 | 2/1970 | Hirs | 210/791 |
| 4,233,157 | 11/1980 | Miller | 210/406 |
| 4,267,060 | 5/1981 | Miller | 210/741 |
| 4,481,108 | 11/1984 | Bratten | 210/137 |
| 4,664,813 | 5/1987 | Schneider | 210/771 |
| 5,059,318 | 10/1991 | Benesi | 210/227 |
| 5,128,029 | 7/1992 | Herrmann | 210/137 |
| 5,133,884 | 7/1992 | Carlsson | 210/791 |
| 5,292,434 | 3/1994 | Benesi | 210/770 |

*Primary Examiner*—Frank Spear
*Attorney, Agent, or Firm*—George W. Wasson

[57] ABSTRACT

A filter apparatus and method is disclosed for separating solid materials from liquid materials in a slurry fluid. The apparatus includes separable plate members (12, 14) that are pressed against each other to form a filter chamber (10). The plates have mating surfaces (34, 54) and hollow interior portions that create the chamber. A filter medium (28) is placed between the mating surfaces before the plates are closed. The apparatus includes means for forcing wash fluids, liquids or gasses through the slurry to force the fluids from the slurry and to produce a dry filter cake of the solids. After the filtration has been completed, the plates are separated leaving the filter cake on the filter medium and the filter medium is advanced out of the filter chamber moving a clean filter medium between the open filter plates. Another filter operation them proceeds. The filter medium is cleaned outside of the filter apparatus and can be prepared for reuse. The filter apparatus may include stacked multiple filtration chambers with operating mechanism (100) for accomplishing the simultaneous opening of each chamber.

10 Claims, 10 Drawing Sheets

FILTER APPARATUS AND METHOD

This application claims priority based on U.S. patent application of Steve C. Benesi, Ser. No. 864,524, filed Apr. 7, 1992, now U.S. Pat. No. 5,292,434, and is a continuation-in-part of that U.S. application for additional disclosures and claims in this application.

FIELD OF THE INVENTION

This invention relates to a filter apparatus and a method for operating a filter apparatus and, more particularly, to a filter apparatus for extracting liquids from a wet slurry fluid and for producing a substantially dry filter cake of the solid materials in the slurry. The apparatus includes a structural form that includes a single filter chamber formed from separable upper and lower plate members and a structural form that includes stacked multiple filtration chambers which to some extent duplicate the single filter chamber form but include operating mechanisms that open or close each of the filter chambers simultaneously. One application of the present invention is in the treatment of slurry fluids having toxic or hazardous materials in either the liquid or solid portion of the slurry fluids and to applications where the liquid portion of the slurry fluid is adaptable to being returned to the system from which the slurry fluid was produced. Another is the removal of fines larger than ½ micron in metal rolling coolant, where the process is continuous instead of "batch" processing of slurry materials.

BACKGROUND OF THE INVENTION

In many industrial processes and in fluid production systems, a slurry of solids suspended in a liquid is produced and it becomes necessary to separate the solids from the liquids so that each material may be treated in ways that will make disposal or use of the treated materials both economical and environmentally effective. In most such processes or systems, the slurry material is fed to a filter apparatus which may take many forms including a belt press, a vacuum filter or a pressure filter. In one form of pressure filtration system a pair of plate members form an internal space chamber separated by a filter media of some form. The plate members are pressed together at mating surfaces with the filter media positioned between the mating surfaces and spread across the interior space separating one plate from the other plate. Slurry materials are fed into one plate and into the chamber while filtrate liquids are taken away from the other plate leaving behind the solids of the slurry accumulated on the filter media. After a sufficient amount of slurry has been treated to accumulate solid materials, the plates are separated and the filter media is replaced and the filtration process is repeated with a clean filter media. The filtrate fluid and solids are then separately used, treated or disposed of in an acceptable manner.

The prior art apparatus of the nature of the above described apparatus have used pressurized gas or vacuum filtration to extract the fluids from the slurry materials. Vacuum-atmosphere pressure differentials have not been effective in creating "dry" solids in the filter cakes they produce and only marginally produce solids in filtrate. Other technologies used in filter apparatus have employed elastomeric diaphragms within the chamber with the diaphragm hydraulically (or pneumatically) actuated to create pressure differentials to squeeze out liquids from solids. Such systems may use compressed air (sometimes called "air-fluff") following the hydraulic diaphragm squeeze to drive out interstitial liquid. Such systems are not as cost effective as pressurized gas filtration because those systems usually require both the air pressure step as well as the diaphragm squeeze to produce dry solids. Further, elastomer diaphragms limit the chamber size and hence limit the solids cake size that can be produced and thus the filter effectiveness. In addition, heat and chemicals may adversely effect elastomer diaphragms. Also, the diaphragm and air squeeze systems add time to the filtration cycles resulting in lower efficiency and lower production rates.

In a prior U.S. Pat. No. 5,059,318, issued Oct. 22, 1991 to the present inventor, there is disclosed a system and apparatus for producing an effective seal between mating filter plates in a manner to substantially reduce or completely eliminate leakage of slurry fluids between the mating filter plates. The present invention relates to such a filter apparatus and discloses the apparatus and method for producing an effective separation of liquids and solids in a slurry material. In the filtration process of the present apparatus and method air, gas and liquid cycles are used in the filtration process to produce an initial high pressure squeeze to clear liquid from solids in the slurry and to drive free interstitial liquid from the solids cake.

SUMMARY OF THE INVENTION

In accord with the present invention, a filter apparatus is formed with a pair of plate members with recessed portions which mate with each other to create a filter chamber between the plate members and a filter medium is positioned between the mating plate members. The peripheral sidewalls of the plate members are adapted with internal grooves for effectively sealing the mating faces of the plates. The filter chamber is adapted to receive the slurry to be filtered and one of the plates is adapted to contain the slurry and to receive controlled fluids or gasses under pressure to force the liquids from the slurry. The other of the plates is adapted with suitable means to support the filter medium and to receive the liquids extracted from the slurry while the solids are retained within the chamber. The plates are moved relative to each other to mate the sidewalls and seal the chamber during the filtering process and, after the filtering has been completed, the plates are separated to permit the solids from the slurry to be removed from the filter chamber. The movement of the solids is accomplished by moving the filter medium from between the separated plate members both for the purpose of removal and for introducing a clean filter medium between the plates. The plates are then ready to be pressed against each other again for a repeat of the slurry filtering process.

The present invention also includes the stacking of multiple duplicate filter chambers formed from mating upper and lower plate members with suitable operating mechanisms that close and open the stacked filter chambers simultaneously. The stacked filter chamber form increases the capacity of the assembled apparatus while employing a single control system operating the chambers simultaneously.

The present invention provides for the use of a continuous filter medium belt that can be placed between the plate members, pressed between the plate member sidewalls and retained within the filter chamber, and when the filtering process has been completed the belt can be advanced to remove the filtered solids and to move a clean filter medium between the plates. The filter apparatus provides a means for advancing the filter medium to a cleaning position outside of the chamber and for sensing the positioning of the filter medium to a proper alignment within the chamber in position for the next filtering operation. This results in more area of filter medium being used, less medium travel, and shorter cycle times. Alternatively, the filter medium may be disposable with the filter cake and a new portion of filter medium is advanced into the apparatus with each batch operation.

The filtering of slurry fluids with the present apparatus is performed in an efficient manner by insuring a uniform placement of the slurry fluids within the filter chamber and the timely application of wash fluids (if used) and/or pressurized gasses to the slurry fluids at optimum pressure to force "free liquid" from the slurry fluid and the interstices of the solids in the slurry. "Free liquid" is liquid not adhering to the solid particles of the slurry; this free liquid can be removed by the application of an initial fluid or gas pressure to the slurry in accord with Poiseuille's Law of fluid flow through a permeable solid. Poiseuille's Law:

A. Velocity of a liquid flowing through a capillary is directly proportional to the pressure of the liquid and the fourth power of the radius of the capillary. (A solids filter cake is non-compressible and the radius of capillaries (interstices) is fixed.)

B. Velocity of a liquid flowing through a capillary is inversely proportional to the viscosity of the liquid and length of the capillary.

Poiseulle's Law as applied to the present apparatus indicates that the pressure across a permeable solid is proportional to the liquid velocity through the solid and, as applied to the filtering of slurries, the pressure is directly proportional to the liquid velocity through the retained filter cake. As applied to the present apparatus, an increase in filter cake size (length of capillary) is proportional to increase in pressure across the filter cake for the same dewatering time and viscosity of liquid. Since certain gas or air pressures are standardized, it is beneficial to put these pressures to their most cost effective use in the filtering process. The present apparatus is provided with pressure control and sensing means to permit the application of fluids and/or gasses at the appropriate times plus pressure sensing to control the flow of free liquid from the pressure within the filter chamber; when the free liquids clear the solids of the filter cake, the permeability and gas flow through the solids cake increases and the chamber pressure drops. In accord with the present invention, the timing and pressure of the initial introduction of pressurized fluids or gasses at optimum pressure is controlled to optimize the performance of the filter apparatus in the removal of liquids and the production of a substantially dry filter cake.

With the present apparatus the filtering process can be further enhanced by the application of solvent extraction materials to the slurry materials to remove additional liquids or materials with the liquids or to extracting desired or undesired materials from the filter solids. Because the chamber is adapted for the introduction of liquid and gasses at controlled times, the treatment of slurry filtrate or slurry filter cakes can proceed within the chamber as the filtering process proceeds.

The filter apparatus of the present invention can also be used as a means for recovering and renewing recleanable filter media as is used sometimes with coolant fluids in metal working or rolling operations. In such applications the filter apparatus is not recycled in short batches but is operated to renewed and recycled coolant materials while the cooling fluids of the process are temporarily diverted to another filter means. When the chamber is reformed with a clean filter medium, the filtration process proceeds as a continuous process using the apparatus of the present invention. The apparatus may also be used in these metal working operations for removing and discarding filter media after each cycle.

It is an object of the present invention to provide a filter apparatus that can be efficiently prepared to handle a batch of slurry materials to produce a substantially dry filter cake in a minimum of time and may be recycled to place the filter apparatus in condition to handle another batch of slurry materials in a minimum of time.

A further object in accord with the preceding object is to provide a filter apparatus with associated control means that will permit the optimized application of fluids and gasses to the filter apparatus in optimized timings and pressures.

A further object in accord with the preceding objects is to provide a filter apparatus with a filter medium belt material and construction that will permit the belt to be automatically positioned between mating plates of the apparatus in controllable steps to maximize the use of the filter medium, shorten cycle times, reduce belt travel times, and increase ease of belt tracking.

A further object of the present invention is to provide a filter apparatus formed with mating filter plates and a filter medium between the plates with controlled mating of the plates to substantially reduce or eliminate leakage of slurry materials or slurry filtrate between the mating plates.

A further object of the present invention is formation of stacked filter chambers and operating mechanisms for opening and closing the stacked chambers simultaneously.

These and further objects and features of the present invention will be readily apparent to those skilled in the art from the appended drawings and specification illustrating a preferred embodiment wherein:

DESCRIPTION OF THE PREFERRED EMBODIMENT

Figure 1:
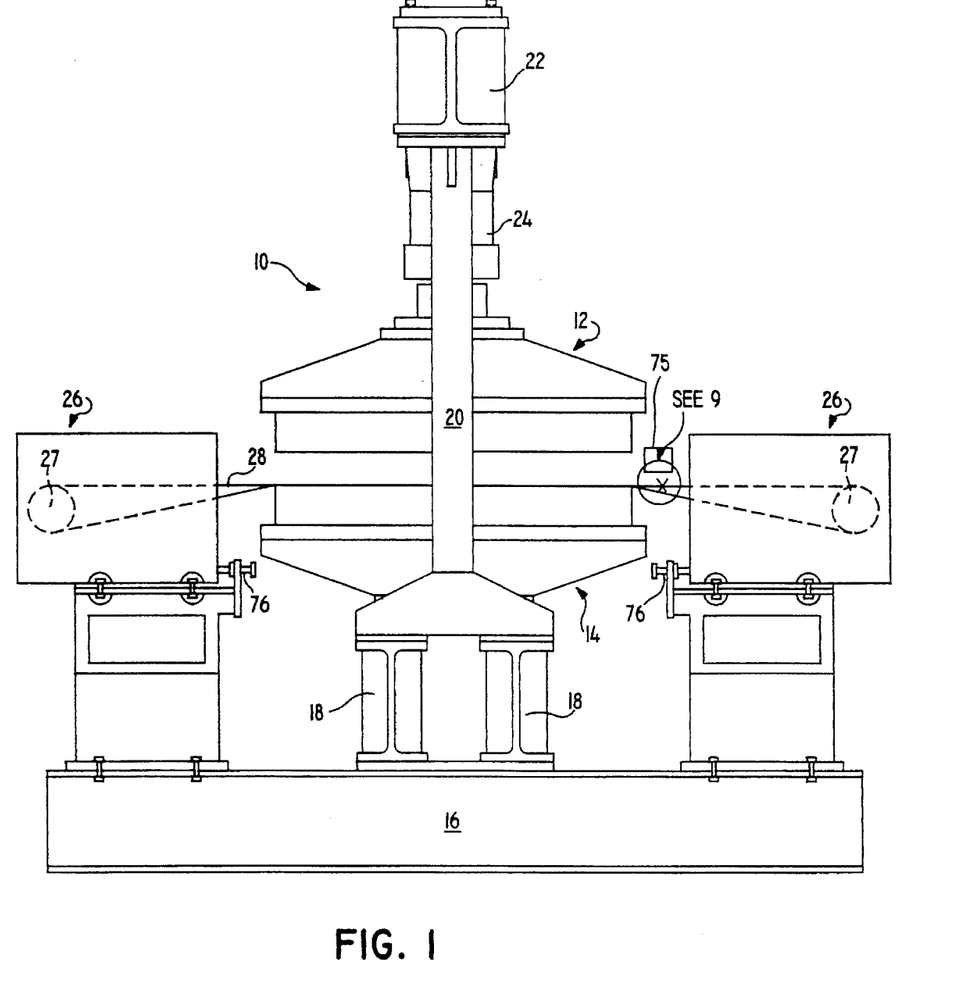
FIG. 1 is an elevational view showing the apparatus of the present invention as assembled open position.

As illustrated in the assembly drawing of FIG. 1, the filter apparatus 10 of the present invention comprises a pair of plate members, an upper plate member 12 and a lower plate member 14, supported on and relatively movable within a support frame assembly comprising a pair of base beams 16, a pair of lower strongback members 18, a pair of spaced tension columns 20, and an upper strongback member 22. As shown more clearly in FIG. 3, the support frame assembly is an assembly of the lower strongback members 18 on the base beams 16 with the spaced tension columns 20 mounted on the lower strongback member 18 and the upper strongback member 22 mounted on the tension columns. The frame assembly has an open interior portion for the support of the lower plate member 14 on the lower strongback 18, with suitable spacing and bracing as will be described more particularly with reference to FIG. 6, and support of the upper plate member 12 suspended from the upper strongback 22, with suitable spacing and bracing as will be more particularly described with reference to FIG. 4, and support of a hydraulic jack mechanism 24 between the upper plate member 12 and the upper strongback 22. As shown in FIG. 1 for a continuous belt operation, at each side of the assembly and mounted on the base beams 16, a pair of filter belt drive and washing assemblies 26 including rollers 27 are mounted for movement and treatment of a filter belt 28; the feed or drive function and the washing function can be performed at either side of the assembly as will be explained later in this specification. It should also be understood that in the alternative form of the apparatus using a disposable medium, there will be a different feed apparatus; however, the medium will be placed in the same location and advanced with each operation of the apparatus.

Figure 2:
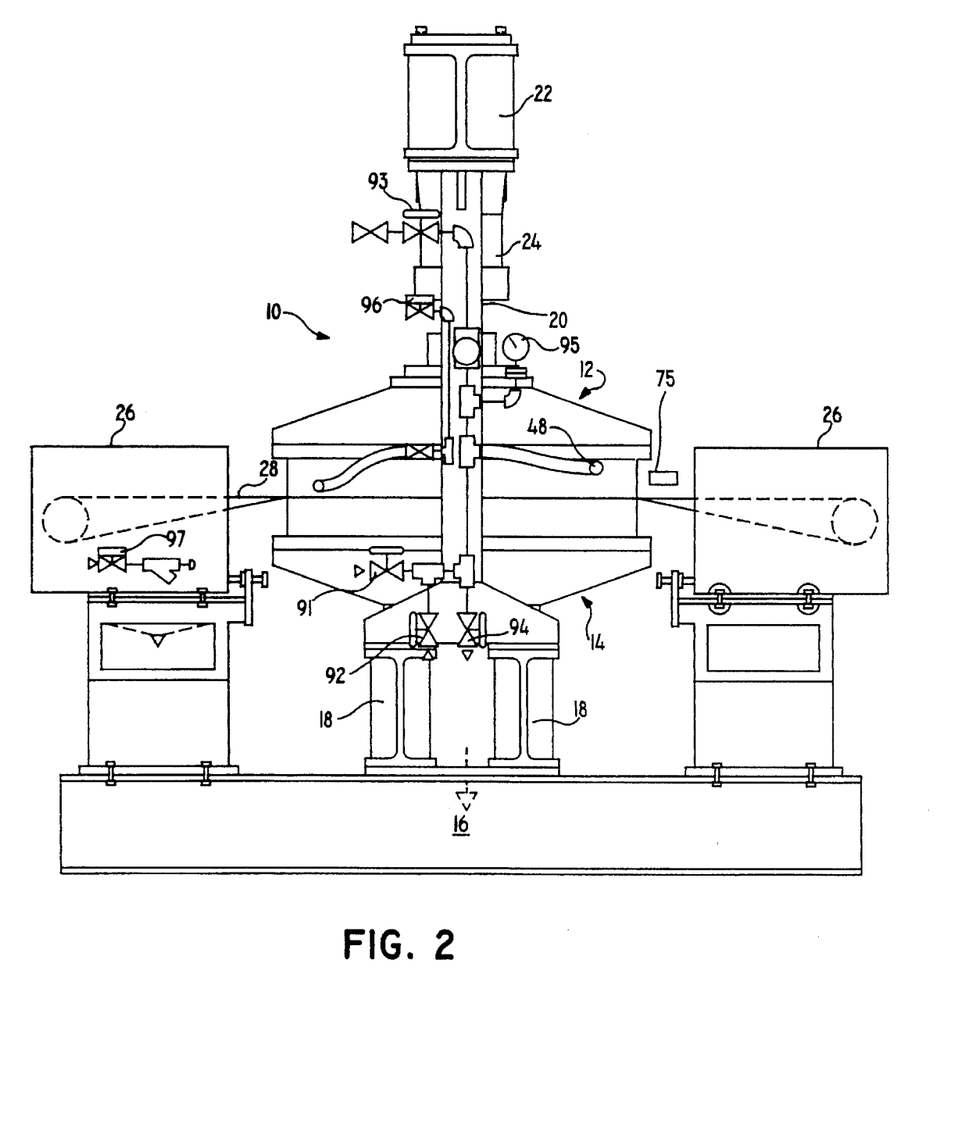
FIG. 2 is an elevational view showing the apparatus of the present invention with the plates of the filter in closed position and showing, schematically, the valve and piping system for fluids, liquids and gasses to the apparatus.

FIG. 2 illustrates the assembled filter apparatus of the present invention with the plate members closed and the filter belt 28 between the upper plate 12 and the lower plate 14. The hydraulic jack mechanism has been operated to force the plates together at a force at least exceeding the force created by the pressurized fluid with the belt filter medium in between the plates to seal the filter chamber that is created between the closed plates.

It should be understood that a great deal of care is taken in the fabrication of each of the structural elements to assure that the assembly will be level, plumb, true and parallel as the plates are closed. In that regard it is important that the lower face of the upper strongback 22, the upper and lower mating faces of the upper plate member 12, the upper and lower mating faces of the lower plate member 14 and the mating faces of the lower strongback 18 be horizontal and parallel. The tension columns 20 and the centerline of the upper plate 12 and lower plate 14 should be vertical and parallel to each other and perpendicular to the the horizontal members. With care in the leveling and truing of these elements the plate members will engage each other and produce a good seal as they are closed, as well as align operating forces to their most effective use with a minimum of operating stress.

Figure 4:
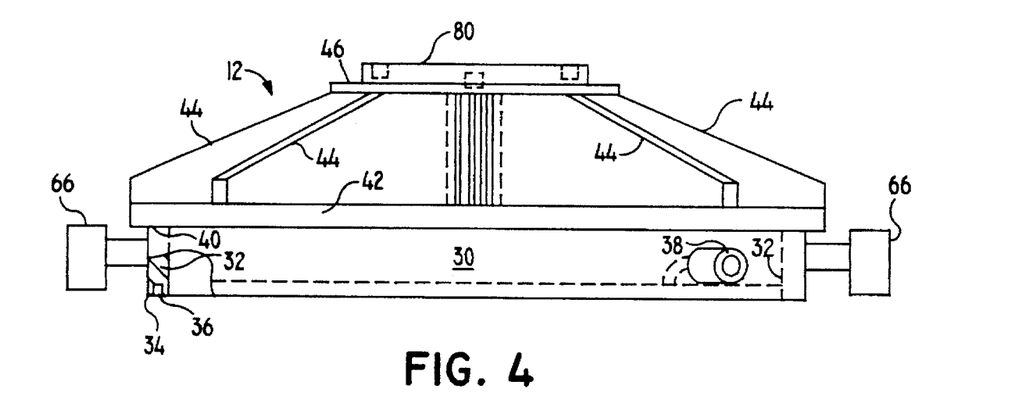
FIG. 4 is a side elevational view in partial section of the upper plate of the apparatus.
Figure 5:
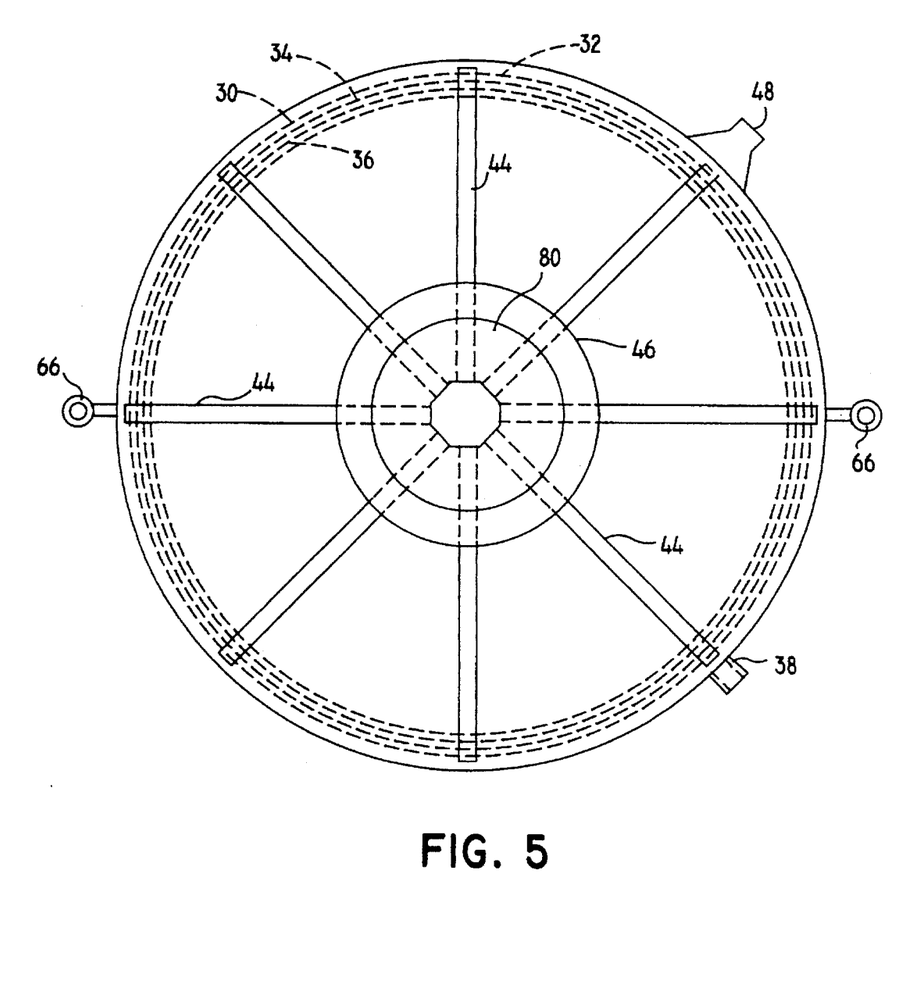
FIG. 5 is a top plan view of the upper plate of the apparatus.

Referring now to FIGS. 4 and 5 illustrating details of the construction of the upper plate member 12, the plate member comprises a cylindrical member 30 presenting an interior chamber area between the sidewall portions 32. The lower face 34 of the sidewall 32 of the wall member 30 has a recessed groove 36 around the entire periphery of the wall member. An external connection 38 connected to the recessed groove 36 is adapted to provide for pressurizing the groove as will be explained later. The upper face 40 of the sidewall is capped with a cap plate 42 and the plate supports a plurality of bracing ribs 44 for distributing forces from an upper jack plate assembly 46 to the sidewall portions of the plate member 12. The jack plate assembly is adapted to be engaged by and moved by the hydraulic jack 24. An entry port 48 passes through the entire sidewall 32 to permit the entry of fluids and gasses into the interior chamber area.

It should be understood that the upper plate member 12 is adapted to be raised and lowered within the frame assembly and that the lower face 34 of the sidewall 32 will be machined and ground to as true a surface as possible within machining tolerances.

Figure 6:
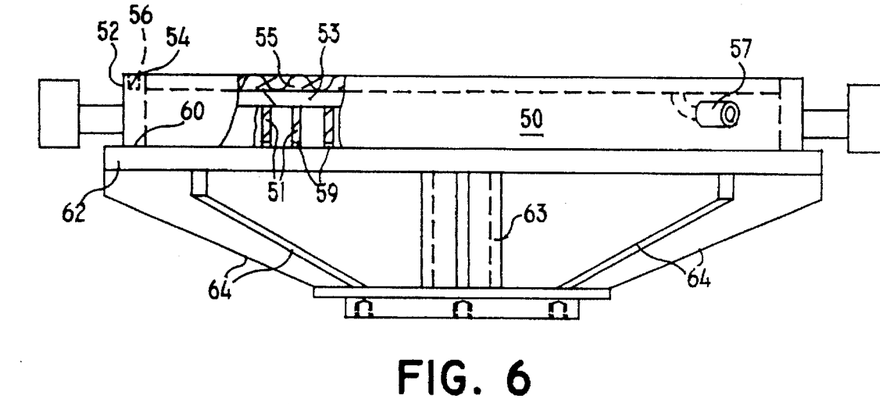
FIG. 6 is a side elevational view in partial section of the lower plate of the apparatus.
Figure 7:
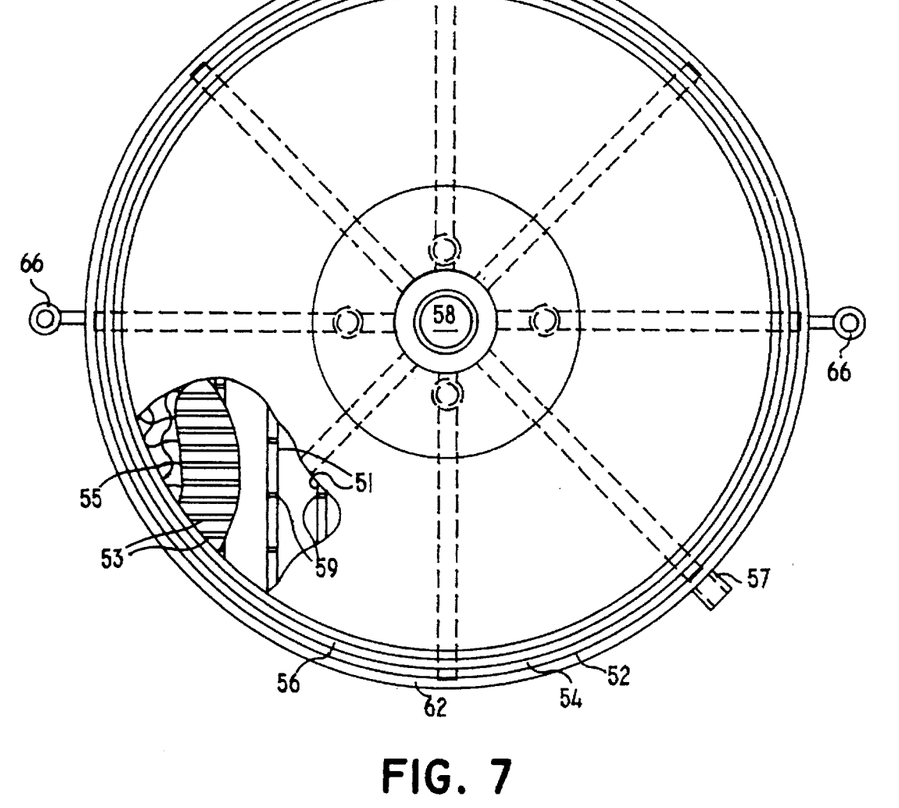
FIG. 7 is a top plan view in partial section of the lower plate of the apparatus.

Referring now to FIGS. 6 and 7 illustrating details of construction of the lower plate member 14, the plate member comprises a cylindrical wall member 50 presenting an interior chamber area between the sidewall portions 52. The upper face 54 of the sidewall 52 has a recessed groove 56 around the entire periphery of the wall member. An external connection 57 connected to the recessed groove 56 is adapted to provide for pressurizing the groove as will be explained later. A central exit port 58 allows for exit of fluids from the interior chamber as will be explained later. The lower face 60 of the sidewall is capped with a base plate 62 and that plate supports a central column 63 and bracing ribs 64 for distributing forces from the lower plate assembly 14 to the lower strongback 18.

It should be understood that the lower plate member 14 is adapted to be stationary and to mate with the upper plate member 12 when that plate is lowered into position to close the filter chamber. The upper face 54 of the sidewall 52 will be machined and ground to as true a surface as possible within machining tolerances.

The grate assembly comprises a first set of spaced, horizontal bars 51 supported on the inside face of the lower plate 62, a second set of more closely spaced, horizontal bars 53 perpendicular to and supported on bars 51, and a woven wire screen 55 supported on the second set of bars 53. Both sets of horizontal bars 51 and 53 include a perimeter wall to hold the bars together. The base of bars 51 are notched at 59 to provide a plurality of passages for fluids to the exit port 58. The upper surface of the woven wire screen is substantially aligned with the finished surface of the upper face 54 of sidewall 52 and provide support for the filter medium 28 when in use. The grate assembly within the chamber area of the lower plate member may be of substantially any construction that will provide uniform support for the belt filter medium that will be positioned between the plate members when they are mated and closed with each other.

Figure 3:
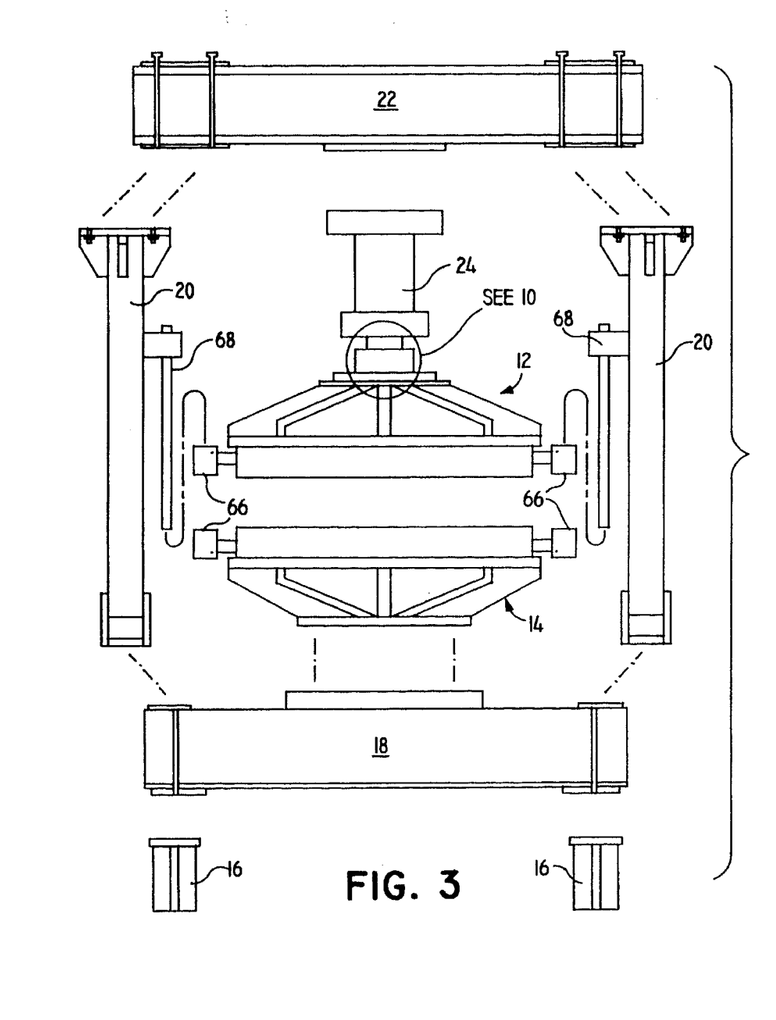
FIG. 3 is an exploded side elevational view of the structural elements of the present invention.

Both the upper plate member 12 and the lower plate member 14 are provided with external plate guides at 66 which are hollow tubular in form for cooperation with guide rods 68 mounted on the tension columns as shown in FIG. 3. The guide rods 68 are aligned to enter through the hollow tube of the plate guides 66 to permit the sensing of the alignment of the plates as they are closed. An alternative construction for the plate guides is the mounting of the guide rods on the lower plate member 14 and the mounting of the hollow tubular member on the upper plate member 12.

Figure 8:
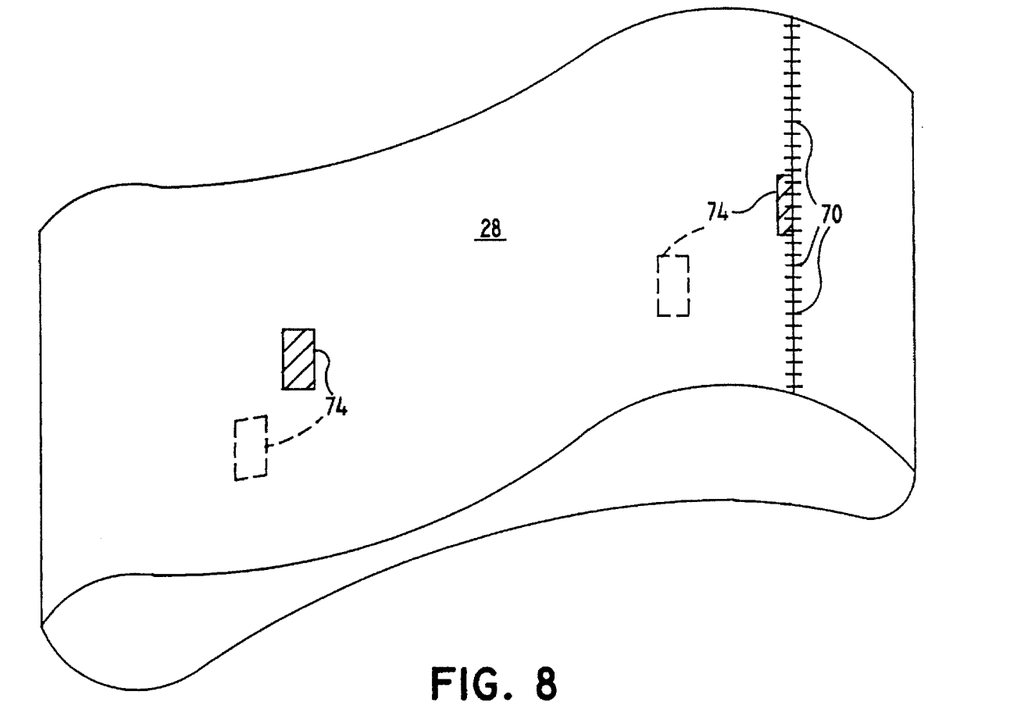
FIG. 8 is a perspective view of the filter medium belt as used in the present invention.
Figure 9:
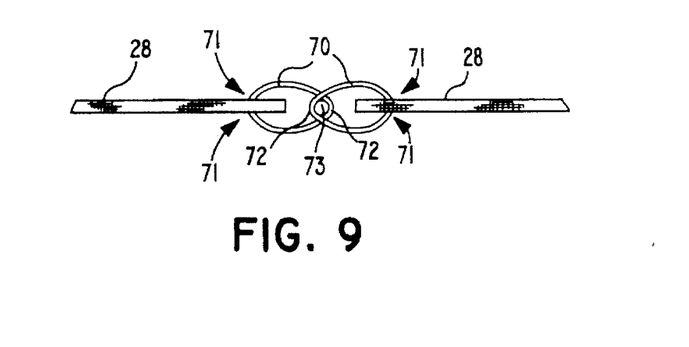
FIG. 9 is a partial sectional view showing the filter belt splice.

FIG. 8 illustrates the form of a continuous belt filter medium 28 that may be used with the apparatus of the present invention. With the continuous belt a double layer of filter medium is created within the filter chamber. It should be understood that the belt need not be continuous and need not be reuseable; that is, the belt may be an elongated rolled or folded belt that will be passed between the plates when they are opened and closed between the plates when they are closed and the belt may be discarded with the filter cake. In the endless belt form 28 as shown in FIG. 8, the belt is formed to be joined at a splice area as shown in FIG. 9 where each end of the belt is finished with meshed hooks 70 that hook onto the belt at 71 and have a loop end at 72 that is adapted to align with the loop end of the meshed hooks of the other end of the belt. A joining pin or bar 73 fits within the loop ends 72 to form the continuous belt. The continuous belt form 28 is provided with an elastomer embedded detectable marker 74. The detectable marker in the elastomer is of a form that can be sensed by a device such as a proximity switch and the detecting of the marker can be used to control the movement of the belt filter. As illustrated in FIG. 1 a proximity detector 75 is mounted adjacent to the belt drive assembly 26 in a spot to permit the belt to be advanced to introduce a clean filter medium between the plate members. With a proximity detector in the belt travel path, the belt can be centered within the filter chamber with proper control of the belt drive mechanisms Alternative forms of locating and positioning means for the belt medium may include tabs on the belt and whisker switches for detecting the tabs.

FIG. 1 also illustrates adjustment means for lateral positioning of the assemblies 26 at both the feed and wash portions. At each assembly a station adjustment device 76 is fixed to the support frame for the feed or wash assembly 26 with adjustable means for moving the assembly toward or away from the filter apparatus and for proper tensioning of the filter belt.

Figure 10:
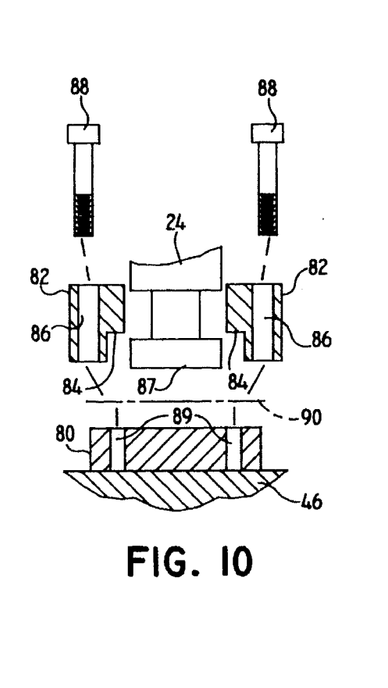
FIG. 10 is an exploded partial sectional view showing a stress concentration area and means for distributing stress in that area.

FIG. 10 illustrates in an exploded sectional view one form of assembly for coupling the upper plate 12 to the moving portion of the hydraulic jack 24. As here illustrated, a jack coupling plate 80 is attached, as by being welded, to the upper plate assembly 46. A pair of jack coupling members 82 with an inwardly directed dog 84 and hollow bore 86. The dogs 84 are adapted to cooperate with a shouldered end 87 of the hydraulic jack mechanism. Bolts 88 pass through the hollow bore and thread into a bolt hole 89 in the jack coupling plate 80. A shim 90 is positioned between the jack coupling plate 80 and the jack coupling 82 to provide for adjustment of the travel and alignment of the upper plate as well as to distribute the concentration of forces resulting from the closing of plates with hydraulic force.

FIG. 2 illustrates schematically the flow paths and valves for operating the filter apparatus of the present invention. Considering first the filtering procedure that is accomplished with the apparatus, the upper plate 12 and lower plate 14 initially are separated and the belt filter medium is resting on the upper surface and grate assembly of the lower plate member 14. When the apparatus is prepared to begin a filtering operation, the upper plate 12 is lowered into contact with the lower plate 14, the seal grooves 36 and 56 are pressurized (or evacuated) through external connection 38 and 57 to produce a good seal between the plates and the slurry to be filtered is entered through entry port 48. The plates are then pressed against each other and the slurry enters the chamber. The chamber of the mated filter plates is then subjected to a prescribed program of washes and air or gas pressures to force the liquids out of the slurry and to retain the solids as a cake on the belt filter medium. The assembly is then opened and the belt is advanced to a wash and dump station where the filter cake is removed from the belt and another portion of the belt is advanced onto the grate assembly of the lower plate member. As illustrated in FIG. 2, a slurry supply valve is shown at 91 and connected to the entry port 48 by suitable piping. Also connected to that same piping is a wash water valve 92 through which may be supplied wash or other liquids for entry into the filter chamber through the entry port 48. That same piping is adapted to supply blowdown air through valve 93 and to permit venting and draining of the piping through valve 94. Also associated with that piping is a pressure gauge 95 for showing the pressure within the filter chamber. A second set of piping connects a seal air valve 96 to the connections 38 and 57 to the recessed grooves 36 and 56, respectively, in the upper and lower plate member sidewall faces. At the wash station (shown at the left in FIG. 2) belt wash fluid is supplied through valve 97. It should be understood that a programmable controller may be adapted to control each of the movements and the valve openings in the proper sequence to accomplish the desired filtration of a slurry fluid.

The apparatus of the present invention may be controlled from a central control panel, not shown, either manually or by operation of a suitable programmable computer that can be programmed for sequence and times of operations. Typical method step operations for the apparatus of the present invention include:

Step 1. With the filter plates fully open and with a clean filter belt in the filter area, the filter plates are closed under pressure to form the filter chamber.

Step 2. When the filter plates are closed with sufficient hydraulic jack pressure to keep the plates closed during a filtration cycle, the slurry supply valve opens feeding slurry into the filter chamber. At the same time the seal air valve opens to supply seal air to the plate mating surfaces at the recessed grooves. After a preset slurry fill time is completed, the slurry valve closes.

Step 3. With hydraulic jack pressure maintained and slurry fill time completed, the slurry wash valve opens allowing wash water to enter the filter chamber to remove solubles from the slurry. After a preset wash period is completed, the wash valve closes.

Step 4. With hydraulic jack pressure maintained, slurry wash time completed and sufficient compressed air pressure applied to dewater and dry slurry solids, the blowdown valve opens introducing compressed air into the filter chamber to dewater the washed slurry and dry the accumulated solids. After a preset time the blowdown valve closes and the seal air valve from Step 2 closes. The header drain valve then opens draining the filter inlet header and venting the filter chamber. After a preset time the header drain valve closes, but leaves enough residual pressure to push the filter cake onto the belt.

Step 5. After blowdown time is completed and the header drain valve open time is completed, the filter plates are opened exposing the accumulated solids filter cake.

Step 6. After the plates have fully opened the filter belt drive mechanism advances the filter belt to discharge the filter cake onto a conveyor belt or bin and to position a clean filter medium for the next filtration cycle.

FIGS. 11–21 relate to stacked multiple filtration chambers for performing the method of the present invention. In high volume filtration operations, it is desirable to increase the capacity of the system by duplicating the apparatus that forms the filtration chambers. While it has been known to stack filtration apparatus, prior art systems have merely moved the stacked elements apart in a series of moves rather than a simultaneous opening or closing of all elements at the same time.

To be effective in increasing the capacity of the system while retaining the efficiency of the single chamber system shown in FIG. 1 it is necessary that the chambers close completely to avoid leaking and open simultaneously to permit all filter media belts to be advanced at the same time. With simultaneous opening and closing, a single control system can be used to initiate the closing, input of slurry, input of pressurized fluids and gases, opening and filter media advance. However, because the chambers are stacked with respect to each other it becomes necessary to move each of the moving chamber elements incremental amounts to account for the movement of the adjacent elements. For example, the lowest chamber upper plate must move a distance of X to separate its upper and lower plates and, because the upper plate of the lowest chamber is effectively connected to the lower plate of the next chamber assembly above it, the upper plate of the next filter chamber assembly must move a distance 2X to produce the proper separation of its upper and lower plate members. When the second upper plate has moved the 2X distance, its upper and lower plates will be separated by the distance X. The third and fourth stacked assemblies must provide for the movement of the upper plate member additional increments of the distance X.

Figure 11:
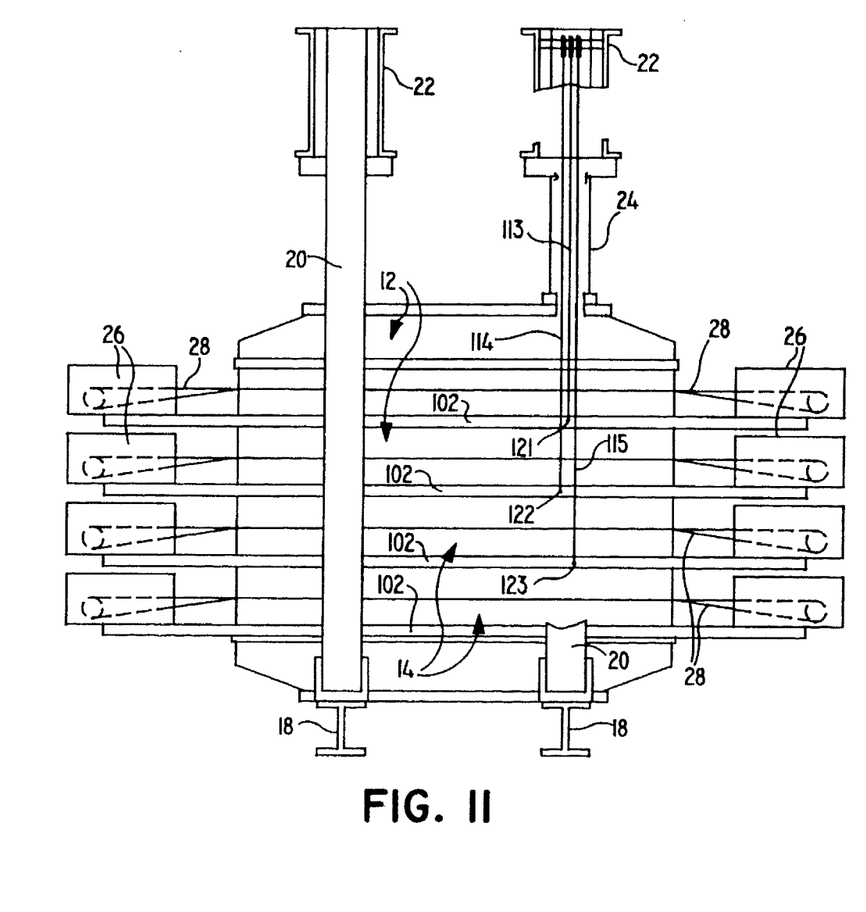
FIG. 11 is a side elevational view partially in section showing stacked multiple filtration chambers in closed position.
Figure 12:
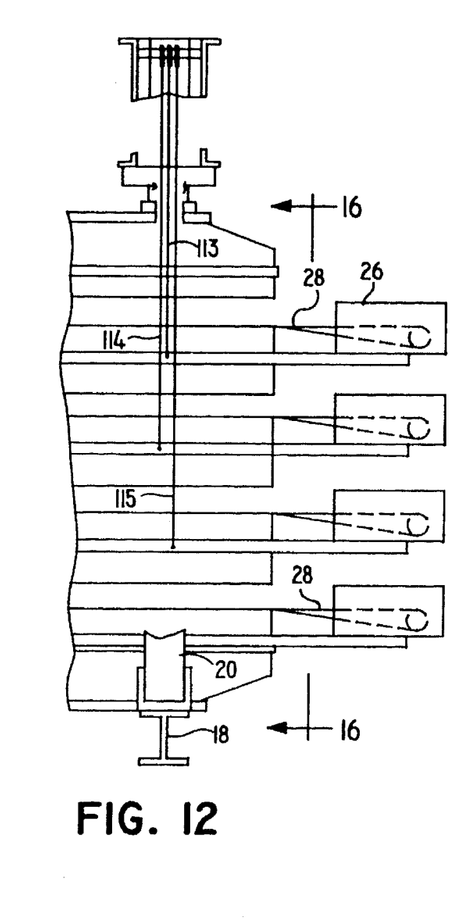
FIG. 12 is a side elevational view partially in section showing stacked multiple filtration chambers in open position.

FIG. 11 and 12 illustrate a stacked multiple filtration chamber apparatus having four duplicated chamber assemblies. The total assembly is supported on lower strongback members 18, between tension columns 20 and below upper strongback members 22 in the same manner as described with respect to FIG. 1. The upper plate members 12 and lower plate members 14 have the same internal construction as described with respect to FIG. 1, except that the upper plate member 12 of the lowest chamber assembly is joined, by suitable means such as support plate 102, to the bottom of the lower plate member 14 of the next adjacent chamber assembly. When so joined, those two plate members move as a unit. A hydraulic jack mechanism 24 is used to raise and lower the upper plate member 12 of the topmost chamber assembly and to operate a mechanical operating system 100 that raise and lower the movable elements of the stacked filtration chambers. Each chamber is provided with its own belt feed and wash assembly 26 for advancing the filter medium 28 and those individual assemblies are mounted on the support plate 102 for its respective filtration chamber. While not specifically illustrated, each chamber will include an entry port and exit port similar to those illustrated with respect to the apparatus of FIG 1.

In the form of operating mechanism illustrated in FIGS. 11–15, a connecting rod 105 is attached at one end to a rib member 107 on the upper plate member 12 of the uppermost chamber by a hinge pin 106 and at the other end to a bell crank 109 pivotally supported in bearings on the upper strongback 22 by hinge pin 110. Bell crank 109 has two legs; one leg is connected by pin 111 to the end of connecting rod 105 and the other leg has a series of spaced holes 112 to which cables 113, 114 and 115 are connected by cable connector pins 116. The series of holes 112 are proportionately spaced to provide for different distances of movement of the cables as the bell crank 109 is rotated about its hinge pin 110.

Figure 13:
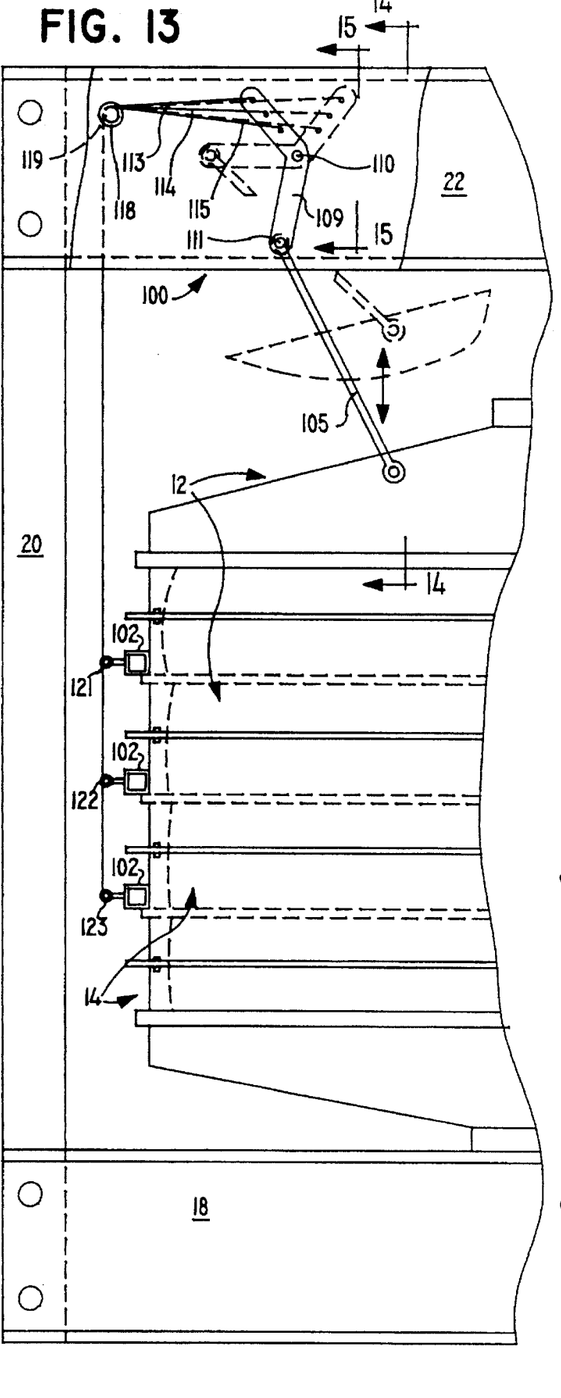
FIG. 13 is a partial elevational view showing a form of operating mechanism for simultaneously opening and closing stacked multiple filtration chambers.
Figure 14:
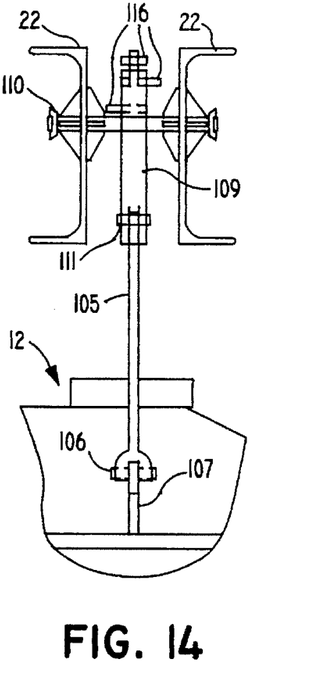
FIG. 14 is a sectional view taken along lines 14—14 of FIG. 13.
Figure 15:
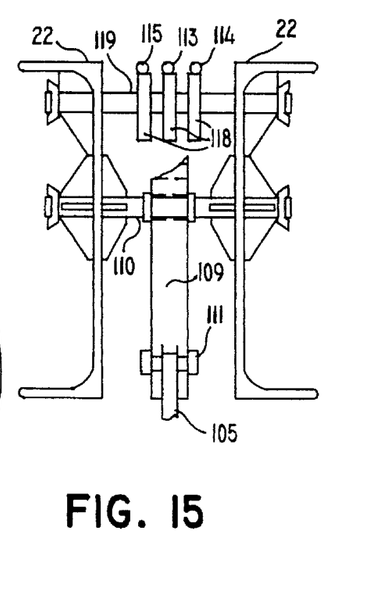
FIG. 15 is a sectional view taken along lines 15—15 of FIG. 13.
Figure 16:
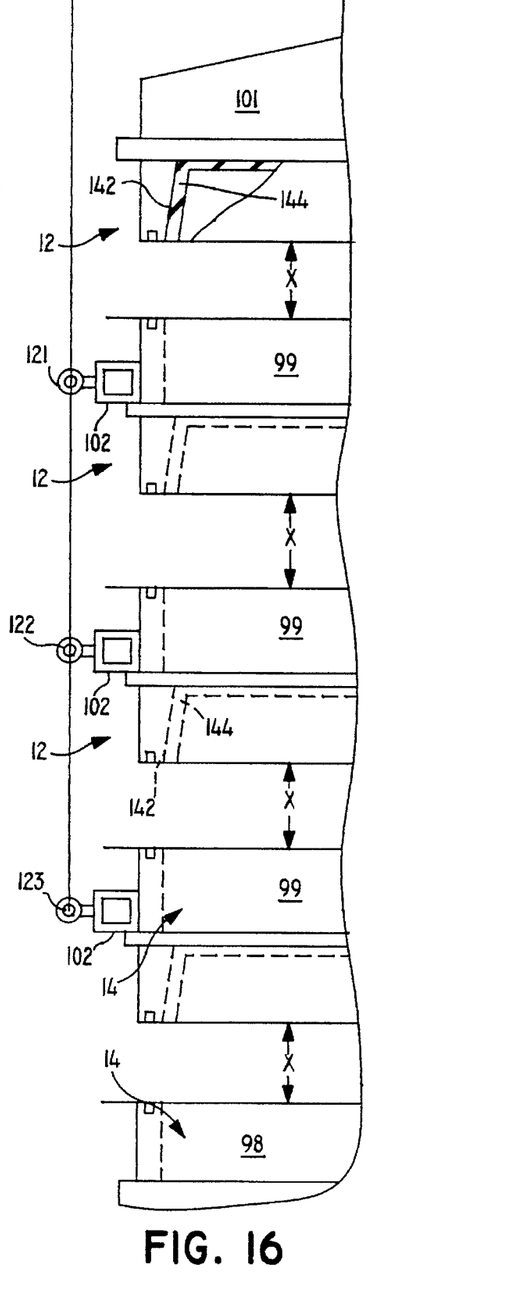
FIG. 16 is an enlarged partial elevational view showing the separated chambers of a stacked multiple filtration chamber apparatus.

By referring to FIGS. 13 and 15, it will be seen that the cables 113, 114 and 115 pass over pulley wheels 118 supported on shaft 119 suitably journaled in the upper strongback 22 and are connected at their other ends, as seen in FIG. 11 and 12, to cable connectors 121, 122, 123 (respectively) on the support plates 102 of the chamber assemblies. In FIG. 13 the bell crank 109 is shown in solid lines in its position when the stacked filter chambers are closed and in phantom lines in its position when the stacked filter chambers are opened. As the hydraulic jack mechanism 24, or other suitable mechanisms, raises the upper plate 12 of the uppermost chamber assembly, the connecting rod 105 rotates the bell crank 109 about its pin 110 and moves the end having the cables 113, 114 and 115 connected to it to the position shown in phantom. The cables then raise the upper plates of the stacked assemblies simultaneously and by distances that differ in accord with the spacing of the holes 112 in the bell crank 109. As seen in FIG. 12 and 16, the stacked filtration chambers are then each opened a distance of X and the filter medium 28 within each chamber can be advanced to remove a filter cake from within the respective chamber. Lowering of the uppermost upper plate 12 by the hydraulic jack mechanism, rotates the bell crank 109 to its closed position and the pressure exerted by the hydraulic jack 24 causes each of the chambers to be sealed with a filter medium between the mating faces of the respective upper and lower plate members.

Figure 17:
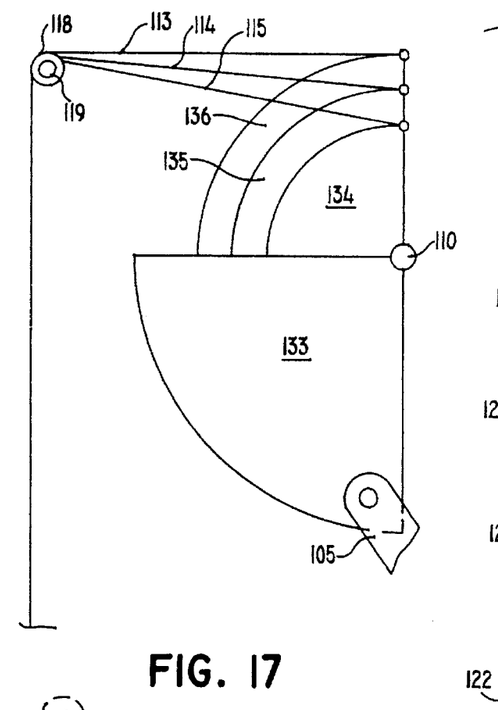
FIG. 17 is an alternative form of cable operating mechanism for simultaneously opening of stacked multiple filtration chambers.

FIGS. 17–21 illustrate alternative forms of operating mechanisms for the opening and closing of the stacked chamber assemblies. FIG. 17 illustrates a semicircular operator 133 pivoted on a pin 110 and operated by the connecting rod 105 in the same manner as the bell crank 109 of FIGS. 13–15. The operator 133 has three separate sectors 134, 135 and 136 that rotate with the operator. Each sector has a different radius and the cables 113, 114 and 115 are connected to the exterior of those sectors. The radii of the sectors are proportioned to move the cables the desired different distances to separate the chambers simultaneously as described with respect to FIG. 13.

Figure 18:
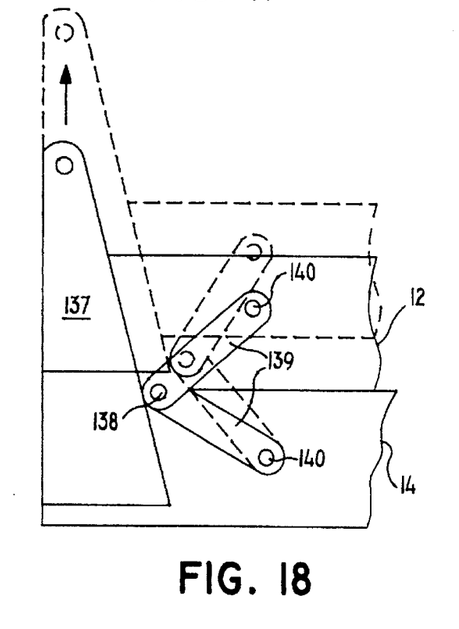
FIG. 18 is an alternative form of operating mechanism for opening multiple filtration chambers.

FIG. 18 illustrates an alternative form of apparatus for coverting the upward movement of the uppermost upper plate member 12 to separating movement for a set of upper and lower plate members. As illustrated, a movable cam surface 137 is moved with respect to a set of upper plates 12 and lower plates 14. A hinged cam follower 138 at the joint of a pair of operator legs 139 having fixed points 140 on the upper plate 12 and lower plate 14 follows the face of the cam surface 137 and moves the plates to the separated position shown in phantom in the figure. The movement of the cam surface and the position of the cam surface with respect to the cam follower 138 on stacked filter chambers will cause each filter chamber assembly to be opened simultaneously.

Figure 19:
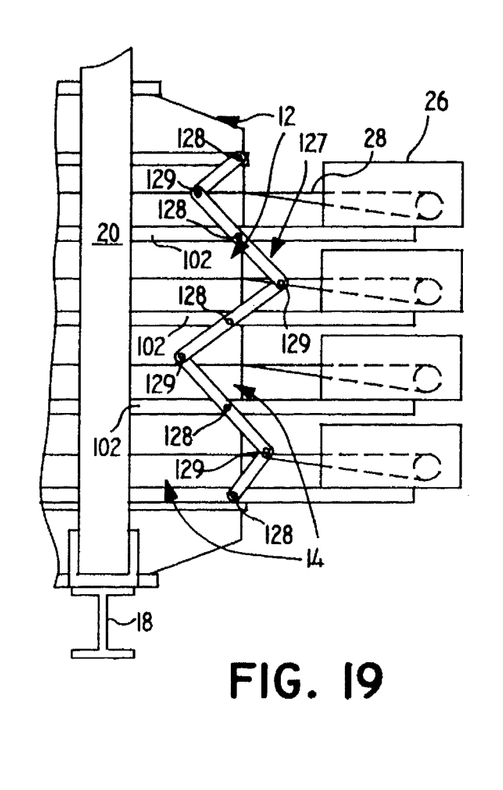
FIG. 19 is a partial side elevational view showing an alternative form of opening mechanism.

FIG. 19 illustrates a scissor mechanism for opening the chambers. As illustrated, the scissor mechanism 127 includes fixed points 128 and movable points 129 with operating arms connected between those points. As the uppermost upper plate 12 is raised, the scissor operating arms rotate about the fixed points 128 causing the movable points 29 to separate the upper and lower plates of each chamber assembly. The scissor mechanism operating arms include one fixed end attached to the lowermost lower plate member and a movable end connected to the mechanical means for opening said stacked chambers. Operation of the scissor mechanism causes all of the lower plate members to be moved with respect to the lowermost lower plate member and each of the upper plate members to be moved with respect to its mating lower plate member to open all of the stacked filter chambers simultaneously.

Figure 20:
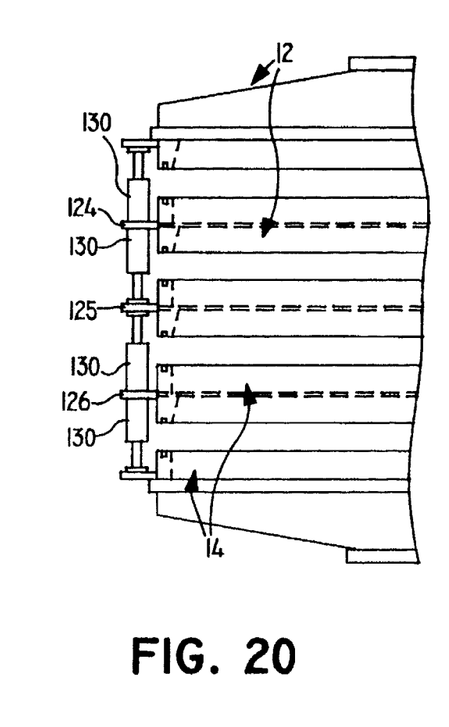
FIG. 20 is a partial side elevational view showing another alternative form of opening mechanism.

FIG. 20 illustrates a pneumatic or hydraulic piston system for opening the filtration chambers. The piston system includes a plurality of pistons 130 having relatively movable ends attached to the upper and lower plates of an assembly. The pistons 130 are mounted to be operating against the operating connectors 124, 125 and 126 so that the pistons can move the requisite differential distances to cause all of the chambers to be opened simultaneously. Under some circumstances it may be desireable to provide flow regulators for fluids to the pistons to assure that each receives the same pressure and thus moves at the same desired rate.

Figure 21:
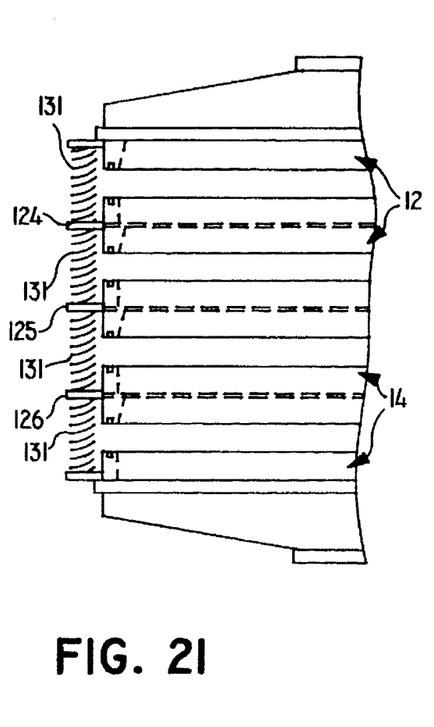
FIG. 21 is a partial side elevational view showing another alternative form of opening mechanism.

FIG. 21 illustrates a spring system for accomplishing the desires simultaneous opening of the chambers. The springs 131 can be either tension or compression springs with fixed ends between the connectors 124, 125 and 126 so that when released, with movement of the uppermost upper plate 12, the springs 131 force or pull the upper and lower plate members apart simultaneously.

The apparatus of the present invention is adapted to a variety of slurry treatments that can produce a desired condition in the filtrate from the slurry or in the filter cake solids. The slurry fluid when it is placed into the filter chamber between the closed filter plates may be initially subjected to a pressure squeeze of air or gas to force free liquid from the slurry. Because of the construction and the sealing of the sidewall faces of the plates, the chamber may be subjected to elevated pressures adapted for each slurry that is encountered. With the slurry pumped into the chamber under pressure and with the initial application of air or gas pressure to the filter chamber an even deposit of the slurry fluid throughout the chamber is insured. The pressure of the air or gas squeeze is optimized to exceed the forces binding the liquids onto the slurry solids in the interstices of the slurry filter cake. The squeeze air or gas pressure can be reduced in time as the filtering process proceeds based on the detected pressure within the chamber. From the foregoing statement of Poiseuille's Law, it can be seen that for the application to the present invention, the pressure applied to the filtering operation may be reduced as the capillaries through the filter cake become opened. With the proper control of the pressure squeeze a substantially solid, dry filter cake is produced.

An additional feature of the present invention is the application of a low pressure differential into the chamber of the upper filter plate and above the filter cake as the filter plates are separated. The application of this low pressure, and (if necessary) a slight taper of the inner wall of the upper chamber, insures that the filter cake will be forced out of the chamber and onto the belt filter medium rather than be stuck in the chamber. When the cake is removed from the chamber, the belt may be advanced to the disposal station and to the wash station as a new, cleaned belt filter medium is moved into position between the filter plates. The removal of the filter cake from the chamber may also be assisted by vibration of the upper filter plate as it is moved away from the lower plate. FIG. 16 illustrates a further modification of the present invention. As illustrated in section, the uppermost upper plate member 12 has an inwardly sloping sidewall 142 and that surface is coated with a non-stick coating 144 to assist in the removal of the filter cake from the chamber. The non-stick coating 144 may be a Teflon surface or other material that will withstand the conditions and temperatures that may be encountered in the operation of the filtration system. FIG. 16 also illustrates the separation of the top plate 101 and the intermediate assemblies 99 with respect to the bottom plate 98. The intermediate assemblies of an upper and lower plate member and a support plate 102 will be provided with individual input and output ports for the input of slurry materials and the exit of liltrate fluids.

The apparatus and piping of the present invention also permits the use of treatment liquids or gasses in the filtration process. For example, the initial gas entered into the chamber after the slurry fluid has been placed can be adapted to prevent the existance of an explosive atmosphere or to create an inert or non-hazardous condition within the chamber. The initial wash may be with a solvent for a solid or a liquid existing in the slurry fluid so as to extract the solid or liquid before or while the filter cake is being formed.

The apparatus of the present invention is particularly adapted to the treatment of slurries produced in geothermal energy sources. Those slurries frequently contain toxic materials and are at elevated temperature. Further, the liltrate extracted from the slurry is needed as an injection fluid to assist in the continued production of geothermal energy from the source. With the apparatus of the present invention, the filtrate extracted from the slurry is available for reinjection into the geothermal source and the filter cake is washed and substantially dried so to reduce the requirements for further treatment before disposal.

The range of pressures that may be used with the present apparatus in the extraction of fluids from the slurry materials includes pressures from about 50 PSI to about 350 PSI. The pressure used to force the filter cake from the upper plate can be a pressure up to 5 PSI. The pressure applied to the recessed grooves in the peripheral sidewalls of the upper and lower plate members should be a difference in pressure of up to about 30 PSI with either recessed groove having a higher pressure than the other and the pressures in the grooves may range from 0 or vacuum to 125 PSI and also 15 PSI to 30 PSI different from the pressure within the slurry chamber.

The force applied by the hydraulic jack is of the order of 275,000 pounds on the faces of the plates so as to create a pressure at the filter plate faces exceeding the pressurized chamber separating forces. The separating force at the faces is the pressure within the chamber times the area of the chamber. The face pressure should be about 10% higher than the separating forces. In the case of the stacked units, the hydraulic jacks might have to supply pressures of the order of 900,000 to 1,000,000 pounds on the face to accomplish the same purpose.

It should be understood that the multiple stacked units shown in FIGS. 11–21 illustrate only one of duplicated hydraulic jack systems and only one of duplicated opening systems. For example, the cable system shown in FIGS. 11–15 would be duplicated at each side of the filter chambers and at each of the tension columns with duplicated connecting rods and bell cranks. Duplicated scissor mechanisms, hydraulic/pneumatic and spring systems would also be used.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A filter apparatus for pressure filtering fluid slurry materials containing liquid and solid materials in a plurality of stacked filtration chambers and for creating a substantially dry filter cake of said solid materials in each of said chambers, said apparatus having mechanical means for simultaneously opening and closing each of said filter chambers including means for maintaining said chambers closed and under pressure during filtering operations and for opening said chambers after filtering has been completed, characterized by:

means establishing each of said filter chambers, each chamber including an upper plate member and a lower plate member, said upper and lower plate members having recessed portions and peripheral sidewalls defining respective chamber areas, said upper and lower plates being relatively movable toward and away from each other to engage said peripheral sidewalls of said upper and lower plate members under pressure and to form one of said plurality of said filter chambers by mating said recessed portions, said lower plate and said upper plate of adjacent stacked chambers being joined to move as a unit during closing and opening of said filter chambers, mechanical means for producing relative movement of said upper and lower plate members with respect to each other to engage and separate said peripheral sidewalls to form said filter chamber and for maintaining a mechanical pressure engagement of said peripheral walls when said peripheral walls are engaged, said mechanical means including means for simultaneously opening and closing each of said stacked filter chambers by producing separate relative movement between said upper and lower plate members forming each chamber while moving each upper plate member proportionately different distances with respect to adjacent upper plate members, entry port means into each of said upper plate members for passage of fluid material including said fluid slurry material into said recessed portion of said upper plate member in each of said stacked filter chambers, exit port means from each of said lower plate members for passage of fluid materials from said recessed portion of said lower plate member in each of said stacked filter chambers, a grate member within said recessed portion of each of said lower plate members, a porous belt filter medium positioned between said upper and lower plate members in each of said stacked filter chambers and contacting said grate within said lower plate members, said belt filter medium having lateral dimensions at least as large as the largest lateral dimensions of said peripheral sidewalls of said upper and lower plate members, said belt filter medium being positioned and aligned to be pressed between said pressure engaged sidewalls of said upper and lower plate members and on said grate when said upper and lower plates mate to form said stacked filter chambers, belt drive means for positioning and removing said belt filter medium from between said upper and lower plate members of each of said stacked filter chambers when said upper and lower plates are separated, means for passing fluids including said fluid slurry material into said entry port means of each of said upper plate members in said stacked filter chambers, and control means
a) for controlling said belt filter medium belt drive means,
b) for controlling said mechanical means for producing relative movement of said upper and lower plate members to cause said simultaneous movement of said upper and lower plate members in said stacked filter chambers,
c) for maintaining said mechanical engagement of said upper and lower plate members under pressure, and
d) for controlling passing of fluids including said fluid slurry material into said entry port means, whereby said fluid slurry materials enter said entry port means for each of said chambers of said stacked filter chambers and liquids from said slurry materials pass through said belt filter medium in each of said stacked filter chambers and exit through said exit port means from each of said stacked filter chambers while solids in said fluid slurry material are retained in said each chamber on said belt filter medium until said upper and lower plate members are simultaneously separated, said solids being formed as a substantially dry filter cake and being removed simultaneously from each of said stacked filter chambers with said belt filter medium after said plate members are separated, and said substantially dry filter cake being removed from said belt filter medium after said belt filter medium is removed from between said upper and lower plate members in each of said stacked filter chambers.

2. The filter apparatus of claim 1 with the addition of guide means on at least one of said upper and lower plates and alignment guide rod means cooperating with said guide means during said relative movement between said upper and lower plate members to sense alignment and engagement of said peripheral sidewalls, and said mechanical means causing cooperating operation of said guide means and said alignment guide rod means during said relative movement of said upper and lower plate members.

3. The filter apparatus of claim 1 wherein said belt drive means includes sensing means positioned with respect to each of said filter chambers for sensing the position of said belt filter medium with respect to said upper and lower plate members and for controlling operation of said belt drive means.

4. The filter apparatus of claim 1 wherein said means for simultaneously opening and closing each of said stacked filter chambers is a cable means including separate cables, each of said separate cables having one end connected separately to an upper plate of said stacked chambers and each cable having another end connected to an operating mechanism for moving all of said cables, said operating mechanism including
a) means moved with said means for producing relative movement of said upper and lower plate members and
b) means for causing each cable in said cable means to move simultaneously and proportionately different distances to move each upper plate member relative to its associated lower plate member,
c) whereby each upper-and lower plate member of said stacked filter chambers is opened the same distance while said upper plate members are moved different distances.

5. The filter apparatus of claim 4 wherein said means for causing each cable to move simultaneously and proportionately different distances is a centrally pivoted bell crank means having one end connected to said means moved with said mechanical means and another end having spaced connection means for said separate cables, the spacing of said spaced connection means providing said proportionately different distance movement of said separate cables.

6. The filter apparatus of claim 4 wherein said means for causing each separate cable to move simultaneously and proportionately different distances is an operator means and a plurality of sector means connected to said operator means, said operator means having a central pivot for both said operator means and said sector means, each of said plurality of sector means having a different radius, one of said plurality of separate cables connected to the circumference of each of said sector means and being moved with said circumference as said sectors are rotated with said operator means about said central pivot, the different radius of each sector providing said proportionately different distance movement of said separate cables.

7. The filter apparatus of claim 1 wherein said means for simultaneously opening and closing each of said stacked chambers is a scissor mechanism having a fixed end and a movable end, said scissor mechanism including movable operating arms, said operating arms having a) fixed points on said joined lower plate and upper plate members of adjacent stacked filter chambers and b) movable connections between said stacked filter chambers, said movable end of said scissor mechanism being connected to said mechanical means for producing relative movement of said upper and lower plate members, said fixed end of said scissor mechanism being fixed to the lowermost lower plate member of said stacked filter chambers, movement of said scissor mechanism with said mechanical means causing all lower plate members to be moved with respect to said lowermost lower plate member and each of said upper plate members to be moved with respect to its mating lower plate member to open said stacked filter chambers.

8. The filter apparatus of claim 1 wherein said means for simultaneously opening and closing each of said stacked chambers is a movable cam means including a cam surface associated with each of said stacked chambers and a hinged cam follower associated with each of said cam surfaces, said movable cam surfaces being moved with said mechanical means for producing relative movement of said upper and lower plate members, and said hinged cam follower having operating legs with fixed ends at each upper and lower chamber members and the opposite ends of said operating legs being joined to form said hinged cam followers.

9. The filter apparatus of claim 1 wherein said means for simultaneously opening and closing each of said stacked chambers is a piston operating system including a plurality of individual pistons with fixed and movable ends, said pistons being individually mounted to said upper and lower plate members of individual attacked filter chambers and adapted to separate said plate members, and means for operating said pistons to cause simultaneous opening of each of said stacked filter chambers.

10. The filter apparatus of claim 1 wherein said means for simultaneously opening and closing each of said stacked chambers is a spring operating system including a plurality of individual springs with fixed and movable ends, said springs being individually mounted to said upper and lower plate members of individual stacked filter chambers and adapted to separate said plate members, said spring operating system being operated with said mechanical means for producing relative movement of said upper and lower plate members.

* * * * *